April 16, 1935.  J. H. VICTOR, JR  1,997,987
COMPOSITE SHEET MATERIAL
Filed Jan. 15, 1931
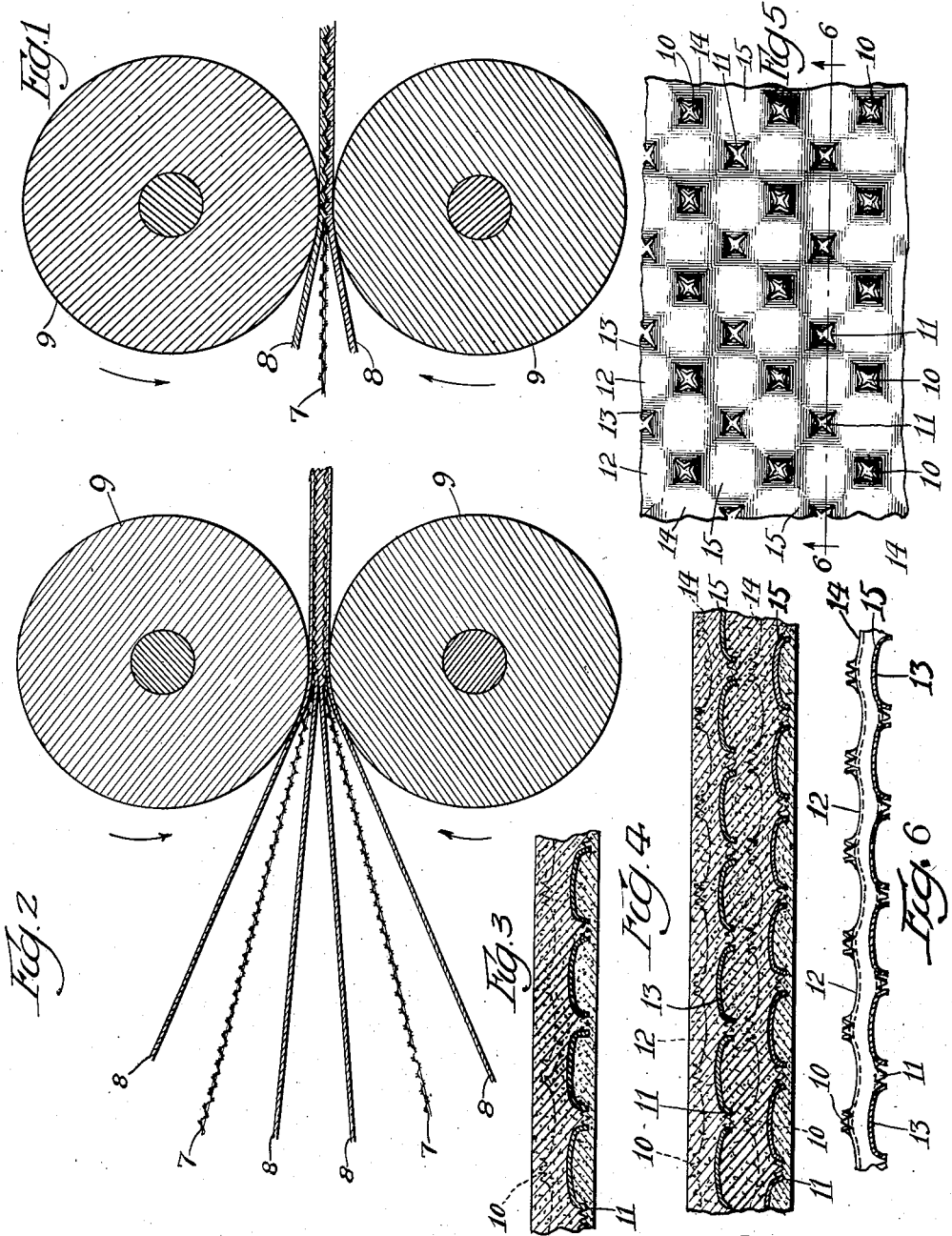

Patented Apr. 16, 1935

1,997,987

UNITED STATES PATENT OFFICE 1,997,987

COMPOSITE SHEET MATERIAL

John H. Victor, Jr., Evanston, Ill., assignor to Victor Manufacturing & Gasket Company, Chicago, Ill., a corporation of Illinois Application January 15, 1931, Serial No. 508,841

7 Claims. (Cl. 154—53)

This invention relates to the manufacture of composite sheet material and method of making and its primary object is to provide a novel sheet material of strong and substantial construction having desirable cushion quality and sufficient stability to enable it to be used for many different purposes.

Another object of the invention is to provide a novel sheet material having substantial stability and insulating quality and adapted to be used in sheet form as a screen for blow torch and electric welding work and for many other protective and insulating purposes.

Another object is to provide a novel sheet material which is heat resistant and has substantial stability and cushion quality adapting it for use as a stock material from which stampings may be made for a wide variety of joint packing and which will adapt itself readily to joints and form an effective seal against the escape of fluids.

Another object is to unite in a single unitary sheet material a plurality of layers of refractory and reenforcing material combined and arranged to form a strong and substantial non-rigid unitary sheet material which has sufficient stability and heat-resisting quality to enable it to be used in considerable areas for many different purposes and which is also adapted for making joint packing and other products.

And a further object is to provide a novel method for the manufacture of the sheet material herein described.

In the accompanying drawing I have illustrated selected embodiments of the invention and referring thereto Fig. 1 is a sectional view showing two layers of refractory material and a single layer of reinforcing material passing between rollers which compress the refractory material upon the reenforcing material and embed the reenforcing material in the refractory material to form the sheet material of this invention.

Fig. 2 is a similar view showing two layers of reenforcing material alternating with refractory material and passing through rollers for producing the sheet material.

Fig. 3 is an enlarged detail sectional view showing the sheet material produced in the pressure rolling operation of Fig. 1.

Fig. 4 is an enlarged detail sectional view showing the sheet material produced in the pressure rolling operation of Fig. 2.

Fig. 5 is an enlarged plan view of a fragment of a reenforce layer.

Fig. 6 is a sectional view on the line 6—6 of Fig. 5.

Referring to the drawing, the sheet material may be made up of alternate layers of refractory and reenforcing material, any number of which may be used according to the thickness of the sheet material required. The refractory layers consist of asbestos, asbestos composition, millboard or other heat-resisting material, and the reenforcing layers consist of thin metal sheets provided with perforations which receive the refractory material and prongs which are embedded in the refractory material to produce a unitary composite structure which is non-rigid, which possesses a high degree of cushion quality, and which is heat-resistant and capable of being used for many purposes. In Fig. 1 I have shown how a sheet material like Fig. 3 can be made with a single reenforce layer 7 interposed between two refractory layers 8, 8. In Fig. 2 I have shown how two reenforce layers 7 may be alternately arranged and embedded in four refractory layers 8. Any suitable number of layers may be provided and in any suitable arrangement and the layers are fed to pressure rolls 9, 9 which are properly set to force the material of the refractory layers into the reenforce layers and to completely embed the reenforce layers in the refractory material and produce a unitary sheet material. Where two reenforce layers 7, 7 are used as in Fig. 2, I prefer to employ two inner refractory layers 8, 8, but a single refractory layer of a thickness equal to that of the two inner layers 8, 8 may be used for some purposes. I prefer to use the two refractory layers instead of a single thick layer because I find that the resulting sheet material seems to have better cushion quality when the two inner refractory layers are used than when a thick inner refractory layer is used. Hence I use comparatively thin refractory layers in the manufacture of the sheet material, and I have found refractory layers $\frac{1}{32}''$ thick to be entirely satisfactory. A thick layer tends to pad somewhat under the pressure of the rolls and provides a refractory material of varying density which does not give as good a cushion quality as two thin refractory layers. But for some purposes a thick refractory layer may be used instead of the two thin inner layers 8, 8 in Fig. 2 and thick refractory layers may be substituted for the thin outer layers 8, 8 in Fig. 2 as well as for the two refractory layers in Fig. 1. In other words, I find it desirable to use comparatively thin refractory layers and comparatively thin sheet metal reenforce layers because they will produce a sheet material which will satisfy requirements for many different purposes; but it may be desirable to use heavier stock layers for the reenforce and for the refractory to produce sheet material for some purposes and this may be done whenever required. The reenforce is made of thin sheet steel, brass, copper or other suitable material and the sheet is stamped to provide a great number of closely spaced pronged openings 10, 11 preferably arranged in staggered relation on opposite sides of the metal sheet and in symmetrical cross-rows. The sheet is cross-corrugated on both sides having ridges 12 and grooves 13 extending in one direction and ridges 14 and grooves 15 extending in the other direction on the side of the metal sheet shown in Fig. 5. On the other side of the metal sheet there will be grooves opposite the ridges 12 and 14 and ridges opposite the grooves 13 and 15. The pronged openings are stamped in the intersections of the ridges and the prongs project outwardly from the ridges in the direction in which the ridges extend in which the pronged openings are located. In stamping these openings the metal sheet may be slightly deformed so that the top of each ridge will be more or less sinuous and the bottom of each groove will be correspondingly sinuous as indicated in Fig. 4. The refractory layers are preferably dampened for use and when they are passed through the rolls with one or more reenforce layers, the prongs will embed themselves in the refractory layers and the material of the layers is received in the pronged openings and in all of the grooves and depressions of the reenforce layers so that the finished sheet material is a unitary structure in which the metal of the reenforce layers is distributed irregularly and to a certain extent unsymmetrically throughout the refractory material but in a manner which produces a flexible, light but stable heat-resisting sheet material which is compressible and adapted for many different uses. Sufficient roll pressure is applied in the manufacture of the sheet material to secure the desired embedment of the refractory layers and not only are the refractory layers securely united with the interposed reenforce layer but in the form shown in Fig. 2 the inner refractory layers are cohesively united to make a solid sheet material without compacting the refractory material to destroy its cushion quality. When two or more reenforce layers are employed, it is desirable that the pronged openings on the side of one reenforce should be arranged in staggered relation with the openings on the opposing side of the adjacent reenforce as shown in Fig. 4, but it is recognized that this will not always be possible in commercial practice and other arrangements have not been found to be objectionable.

The invention is useful for many different purposes where a light, substantial, heat-resisting, flexible and yielding sheet material is desirable; it may be used in sheet form of large or small areas as screens for blow torch and electric welding work and for use about heating units; it can be cut or stamped to form joint packing of many different kinds for which it is adapted, including cylinder head, manifold and other gaskets, which can be used for many purposes where its cushion and insulating qualities and its substantial stability are of importance. The refractory material of the layer on one side of the reenforce will be united with the refractory material of the layer on the other side of the reenforce at the openings in the reenforce, and the refractory material is firmly seated in the grooves and recesses of the reenforce, so that all the layers are bound together in a solid unitary structure. The irregular conformation of the reenforce layer as well as the pronged openings therein contribute to the formation of the layers into a unitary structure.

I have shown the invention in selected embodiments but I reserve the right to make all such changes therein as may be necessary or desirable to satisfy different conditions of use and within the scope of the following claims.

I claim:

1. Composite sheet material comprising refractory material and a cross corrugated and perforated sheet metal reenforce embedded therein, there being prongs projecting outwardly about alternate perforations on one side of the reenforce and similar prongs projecting outwardly about the other perforations on the other side of said reenforce.

2. Composite sheet material comprising refractory material and a perforated sheet metal reenforce embedded therein and cross-corrugated on both sides, the perforations being located in the intersections of the ridges of the corrugations and the metal struck up to form said perforations projecting outwardly and forming prongs about the perforations.

3. Composite sheet material comprising refractory material and a perforated sheet metal reenforce embedded therein and cross-corrugated on both sides, the perforations being located in the intersections of the ridges of the corrugations and the metal struck up to form said perforations projecting outwardly and forming prongs about the perforations, the prongs of alternate perforations being located on one side and the prongs of the other perforations being located on the other side of the reenforce.

4. Composite sheet material comprising refractory material and a plurality of perforated sheet metal reenforces corrugated on both sides and embedded in the refractory material, the perforations in one reenforce being arranged out of registration with the perforations in the adjacent reenforce.

5. Composite sheet material comprising refractory material and a plurality of perforated sheet metal reenforces cross-corrugated on both sides, spaced apart, and embedded in the refractory material, said perforations being located in the intersections of the ridges of said corrugations and the perforations in one reenforce being arranged out of registration with the perforations in the adjacent reenforce.

6. Composite sheet material comprising refractory material and a plurality of perforated sheet metal reenforces corrugated on both sides, spaced apart, and embedded in the refractory material, there being prongs about the perforations alternately disposed on the sides of each reenforce with oppositely disposed prongs on adjacent reenforces arranged out of registration.

7. Composite sheet material comprising two perforated and corrugated sheet metal layers spaced apart, a layer of refractory material on the outer side of each of said reenforce layers, two layers of refractory material interposed between said reenforce layers, all of said layers being compressed and the refractory material being forced into the grooves and recesses and perforations of the reenforce layers.

JOHN H. VICTOR, Jr.